United States Patent
Ebisu et al.

(10) Patent No.: US 11,648,845 B2
(45) Date of Patent: May 16, 2023

(54) BATTERY MANAGING SYSTEM, BATTERY MANAGING METHOD, AND TERMINAL DEVICE

(71) Applicant: PANASONIC INTELLECTUAL PROPERTY MANAGEMENT CO., LTD., Osaka (JP)

(72) Inventors: Hiromitsu Ebisu, Tokyo (JP); Toshiya Zaitsu, Tokyo (JP); Hiroki Shinohara, Kanagawa (JP); Masashi Takemura, Kanagawa (JP); Kenichiro Shibasaki, Kanagawa (JP); Koji Aoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 87 days.

(21) Appl. No.: 16/971,585

(22) PCT Filed: Feb. 8, 2019

(86) PCT No.: PCT/JP2019/004718
§ 371 (c)(1),
(2) Date: Aug. 20, 2020

(87) PCT Pub. No.: WO2019/163573
PCT Pub. Date: Aug. 29, 2019

(65) Prior Publication Data
US 2020/0384879 A1    Dec. 10, 2020

(30) Foreign Application Priority Data

Feb. 23, 2018    (JP) .............. JP2018-030744

(51) Int. Cl.
*B60L 53/66*    (2019.01)
*B60L 53/80*    (2019.01)
*H01M 10/48*    (2006.01)

(52) U.S. Cl.
CPC .............. *B60L 53/66* (2019.02); *B60L 53/80* (2019.02); *H01M 10/48* (2013.01);
(Continued)

(58) Field of Classification Search
CPC ...... B60L 53/66; B60L 53/80; B60L 2240/70; B60L 2250/16; B60S 5/06
See application file for complete search history.

(56) References Cited

U.S. PATENT DOCUMENTS 9,187,004 B1 * 11/2015 Davis ...................... B60L 53/30
2013/0030580 A1 * 1/2013 Luke .................. H01M 10/441
700/286

(Continued)

FOREIGN PATENT DOCUMENTS

JP    2009-137366    6/2009
JP    2003-102110    4/2013

(Continued)

OTHER PUBLICATIONS

Office Action from Intellectual Property India in Indian Pat. Appl. No. 202047040497, dated Feb. 15, 2021.
International Search Report (ISR) from International Searching Authority (Japan Patent Office) in International Pat. Appl. No. PCT/JP2019/004718, dated Apr. 2, 2019, along with an English language translation thereof.

*Primary Examiner* — David V Henze-Gongola
(74) *Attorney, Agent, or Firm* — Greenblum & Bernstein, P.L.C.

(57) ABSTRACT

The user can readily determine a battery station where a battery exchange can be performed without fail. A management server searches a battery station that suits a battery configuration of an electric vehicle operated by each user according to management information on the battery con- (Continued)

figuration thereof, and to transmit a guidance screen for guiding the user to the searched battery station to the terminal device carried by the user. In particular, the user is guided to a station where the number of fully charged battery devices in a battery exchanger is equal to or greater than the number of battery devices used by the electric vehicle.

7 Claims, 7 Drawing Sheets

(52) U.S. Cl.
CPC ....... *B60L 2200/22* (2013.01); *B60L 2240/70* (2013.01); *B60L 2250/16* (2013.01)

(56) References Cited

U.S. PATENT DOCUMENTS

| | | | |
|---|---|---|---|
| 2013/0030696 A1 | 1/2013 | Wu et al. | |
| 2016/0117759 A1* | 4/2016 | Penilla | B60S 5/06 705/26.9 |
| 2018/0253787 A1 | 9/2018 | Takatsuka et al. | |

FOREIGN PATENT DOCUMENTS

| | | |
|---|---|---|
| JP | 2014-525231 | 9/2014 |
| JP | 2015-015875 | 1/2015 |
| JP | 2017-091426 | 5/2017 |
| KR | 101813257 | 1/2018 |

* cited by examiner

BATTERY MANAGING SYSTEM, BATTERY MANAGING METHOD, AND TERMINAL DEVICE

TECHNICAL FIELD

The present invention relates to a battery management system, a battery management method, and a terminal device carried by a user for managing battery devices that are being used in a battery exchange service whereby users of electric vehicles and other devices exchange battery devices at battery stations.

BACKGROUND ART

In recent years, electric vehicles such as electric motorcycles have attracted attention from the viewpoint of solving the problems of air pollution due to exhaust gas and high fuel costs. The cruising ranges of such electric vehicles are progressively extended owing to the improvement in the performance of the battery devices, but such electric vehicles are unable to operate for extended periods of time due to the inconvenience of requiring the battery devices to be recharged.

In order to eliminate such an inconvenience, battery exchange services have been conventionally known as a mean for allowing operation of electric vehicles fitted with detachable batteries for extended periods of time by allowing spent battery devices to be exchanged with fully recharged battery devices at battery stations (see Patent Documents 1 and 2).

PRIOR ART DOCUMENT(S)

Patent Document(s)

Patent Documents 1: JP2014-525231A
Patent Documents 2: JP2017-91426A

SUMMARY OF THE INVENTION

Task to be Accomplished by the Invention

In such a battery exchange service, it is desirable to allow the number of battery devices each electric vehicle uses or carries to be varied from one vehicle to another while using common battery devices. In such a case, multiple battery devices (such as two battery devices and four battery devices) are required to be exchanged at the same time. If the number of fully charged battery devices that are available at a certain battery station is inadequate for the number of battery devices that are used on an electric vehicle and are required to be exchanged, it is pointless for this electric vehicle to visit this particular battery station for battery exchange. Therefore, there is a need for a technology that allows guidance information that suits each particular electric vehicle to be presented to the user of the electric vehicle so that the user can readily find the battery stations that allow the battery exchange to be performed without fail.

However, according to the prior art disclosed in Patent Document 2, at the time of accepting a reservation for battery exchange at each battery station, the availability of battery exchange at the particular battery station is determined according to the number of fully charged battery devices at the battery station, and the number of battery devices that are required to be exchanged. However, this prior art does not offer any mechanism for presenting guidance information that suits each electric vehicle with the result that the user of the electric vehicle may not be able to readily determine the battery station that allows the battery exchange to be performed in the way the electric vehicle of the user requires.

In view of such a problem of the prior art, a primary object of the present invention is to provide a battery management system, a battery management method, and a terminal device that allow each user to readily determine a battery station at which the required battery exchange can be performed.

Means to Accomplish the Task

The present invention provides a battery management system comprising a plurality of battery exchange devices each provided in a battery station to receive and recharge battery devices returned by users, and lend out recharged battery devices in exchange for returned battery devices; a server device connected to the battery exchange devices via a network to manage a status of exchanging battery devices at each battery exchange device; and a terminal device carried by each user and connected to the server device via the network; wherein the server device is configured to search a battery station that suits a battery configuration of a battery using device operated by each user according to management information on the battery configuration thereof, and to transmit a guidance screen for guiding the user to the searched battery station to the terminal device carried by the user.

The present invention further provides a battery management method for managing battery devices that are being offered for a battery exchange service in a server device, comprising the steps of searching a battery station that suits a battery configuration of a battery using device operated by a user according to management information on the battery configuration thereof, and transmitting a guidance screen for guiding the user to the searched battery station to the terminal device carried by the user.

The present invention further provides a terminal device carried by each user and connected to a server device via a network, wherein the terminal device is configured to display a guidance screen transmitted from the server device and showing a battery station that suits a battery configuration of a battery using device operated by the user.

Effect of the Invention

According to the present invention, the user is guided to a battery station that suits the battery configuration of the battery using device operated by the user so that the user is able to readily determine the battery station at which the battery exchange can be performed without fail.

DETAILED DESCRIPTION OF THE PREFERRED EMBODIMENT(S)

To accomplish the foregoing task, a first aspect of the present invention provides a battery management system comprising a plurality of battery exchange devices each provided in a battery station to receive and recharge battery devices returned by users, and lend out recharged battery devices in exchange for returned battery devices; a server device connected to the battery exchange devices via a network to manage a status of exchanging battery devices at each battery exchange device; and a terminal device carried by each user and connected to the server device via the network; wherein the server device is configured to search a battery station that suits a battery configuration of a battery using device operated by each user according to management information on the battery configuration thereof, and to transmit a guidance screen for guiding the user to the searched battery station to the terminal device carried by the user.

Thus, the user is guided to a battery station that suits the battery configuration of the battery using device operated by the user so that the user is able to readily determine the battery station at which the battery exchange can be performed without fail.

According to a second aspect of the present invention, the server device is configured to guide the user to a battery station when a number of fully charged battery devices in the battery exchange device is equal to or greater than a number of battery devices used by the battery using device.

Thereby, the necessary number of battery devices can be exchanged at the presented battery station.

According to a third aspect of the present invention, the battery exchange device is provided with a storing/dispensing mechanism that stores returned battery devices and dispenses fully charged batter devices by revolving a retainer for the battery devices.

Thereby, a necessary number of battery devices can be exchanged at the battery exchange device. For instance, the battery exchange device may be provided with a plurality of storing/dispensing mechanisms so that the single battery exchange device may be able to perform the exchange of battery devices in an efficient manner. Further, by providing a plurality of battery exchange device in the single battery station, a larger number of battery devices can be exchanged at the same time.

A fourth aspect of the present invention provides a battery management method for managing battery devices that are being offered for a battery exchange service in a server device, comprising the steps of searching a battery station that suits a battery configuration of a battery using device operated by a user according to management information on the battery configuration thereof, and transmitting a guidance screen for guiding the user to the searched battery station to the terminal device carried by the user.

Similarly as with the first aspect of the present invention, the user is thereby readily able to determine the battery station at which the battery exchange can be performed without fail.

A fifth aspect of the present invention provides a terminal device carried by each user and connected to a server device via a network, wherein the terminal device is configured to display a guidance screen transmitted from the server device and showing a battery station that suits a battery configuration of a battery using device operated by the user.

Similarly as with the first aspect of the present invention, the user is thereby readily able to determine the battery station at which the battery exchange can be performed without fail.

An embodiment of the present invention is described in the following with reference to the appended drawings.

Figure 1:
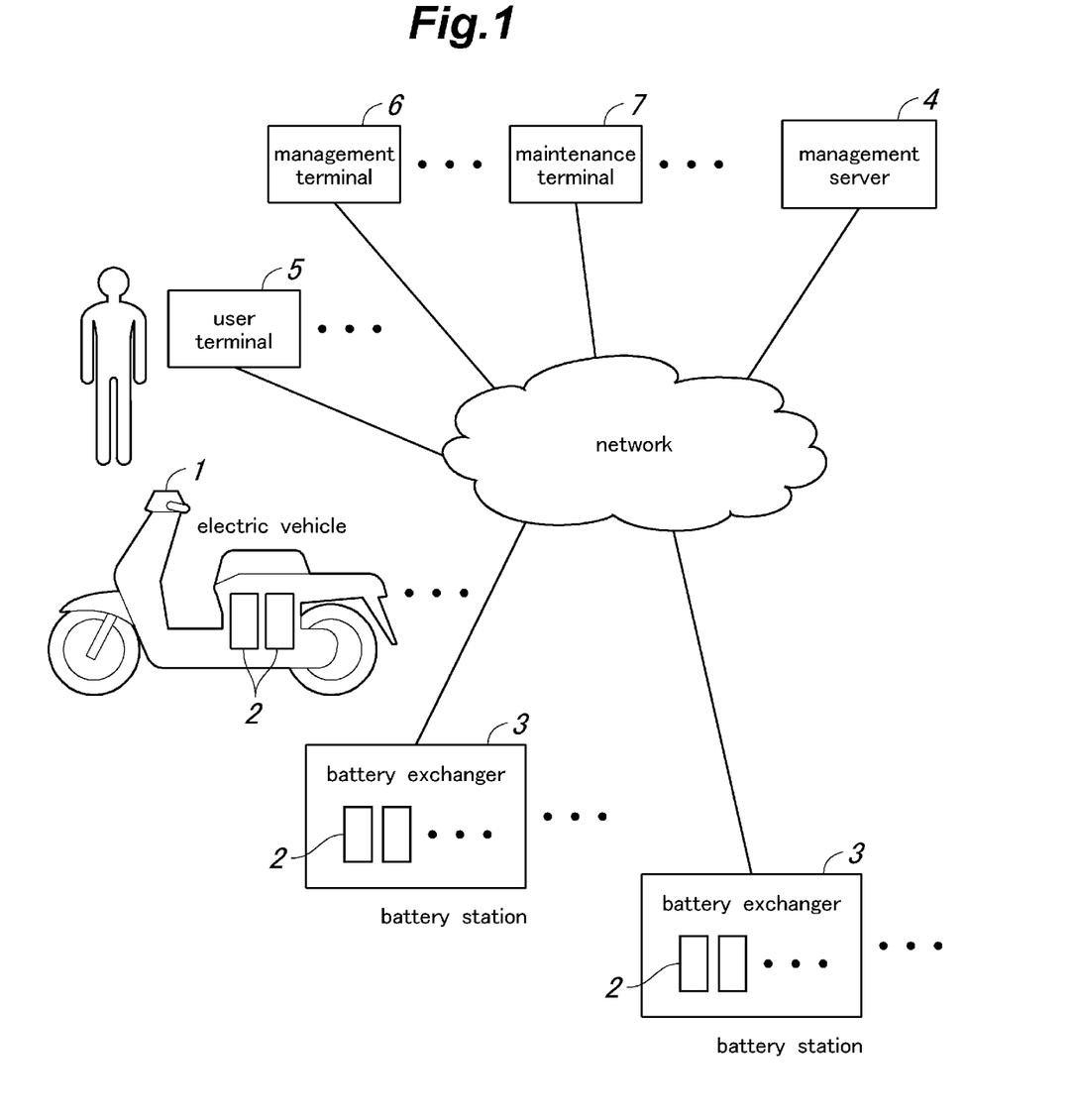
FIG. 1 is an overall schematic diagram of a battery sharing system according to an embodiment of the present invention.

FIG. 1 is an overall schematic diagram of a battery sharing system according to an embodiment of the present invention.

This battery sharing system is configured to provide a service by which battery packs 2 (battery devices) used in electric vehicles 1 such as electric motorcycles can be shared among a plurality of users, and includes battery exchangers 3 (battery exchange devices), a management server 4 (server device), user terminals 5 (terminal devices), a management terminal 6, and a maintenance terminal 7.

The battery exchangers 3, the management server 4, the user terminals 5, the management terminal 6, and the maintenance terminal 7 are connected to one another via a network such as the Internet. The battery exchangers 3 and the user terminals 5 are connected to the network via a wireless communication such as a mobile communication network and a wireless LAN.

Each electric vehicle 1 is fitted with a battery pack 2, and runs on the electric power of the battery pack 2. The electric vehicle consists of an electric motorcycle in the example shown in FIG. 1, but may also consist of a four-wheeled vehicle. It may be a mobility device not for public roads such as an electric wheelchair, an electric cart, or a riding cart for use in a theme park, a golf course or the like.

Each battery exchanger 3 receives and charges the battery packs 2 returned by the users, and lends out the charged battery packs 2 to the users in exchanged for the returned battery packs 2. The battery exchanger 3 is located in a battery station which may be attached to a facility (store) such as a convenience store and a gas station. Multiple battery exchangers 3 may be installed in one battery station.

The management server 4 manages the exchange status of the battery packs 2 in each battery exchanger 3. In addition, the management server 4 monitors the state of the battery exchangers 3 (if online or not) and the state of the battery packs 2 received in each battery exchanger 3 (if fully charged or not), and communicates the state information on the battery exchangers 3 and the battery packs 2 to the management terminal 6 and the maintenance terminal 7. Further, the management server 4 communicates information on the battery stations and the like to the user terminals 5.

Each user terminal 5 may consist of a smartphone, a tablet terminal, or the like, and is possessed by the user of the corresponding electric vehicle 1. The user terminal 5 displays a screen delivered from the management server 4, such as a screen for guiding the locations of the battery stations or a screen for making a reservation for a battery exchange.

The management terminal 6 is placed in a facility where the users receive services or a management center, and is operated by an administrator. The administrator registers users on the management terminal 6, and can view information provided by the management server 4 on the management terminal 6.

The maintenance terminal 7 is placed in a facility dedicated for maintenance operation or a facility such as a store provided with a battery station, and is operated by a maintenance person. The maintenance person can view information provided by the management server 4 on the maintenance terminal 7.

The battery packs 2 to be mounted on electric vehicles are given as an example in the present embodiment, but the battery mounted device in which the battery pack 2 is mounted is not limited to the electric vehicle. The battery packs 2 may also be for use on portable power supply devices, for example.

Figure 2:
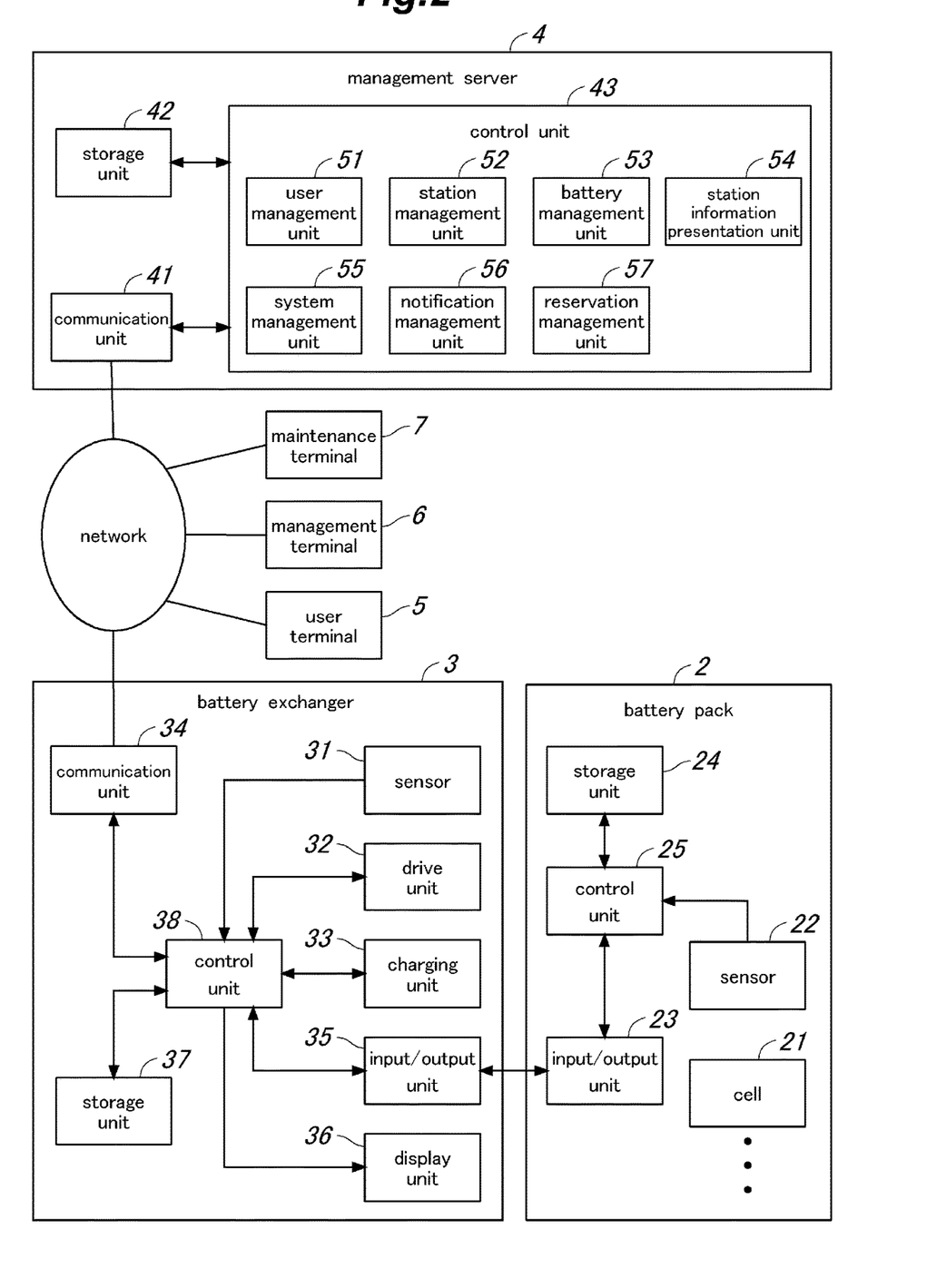
FIG. 2 is a block diagram showing overall structures of a battery pack 2, a battery exchanger 3 and a management server 4.

The overall structures of the battery pack 2, the battery exchanger 3, and the management server 4 are described in the following. FIG. 2 is a block diagram showing overall structures of the battery pack 2, the battery exchanger 3 and the management server 4.

The battery pack 2 includes battery cells 21, a sensor 22, an input/output unit 23, a storage unit 24, and a control unit 25.

The sensor 22 detects the voltage, current, temperature, etc. of the battery cells 21.

The input/output unit 23 forwards and receives information to and from the battery exchanger 3, and forwards serial numbers, alert events, deterioration information, etc. to the battery exchanger 3, for instance.

The storage unit 24 stores a program to be executed by a processor that forms the control unit 25. The storage unit 24 also stores serial numbers (individual identification information) and the like.

The control unit 25 includes a processor, and controls the various parts of the battery pack 2. For example, by receiving detection results from the sensor 22, the control unit 25 detects any abnormal condition and deterioration state of the battery cells 21, and forwards alert and deterioration information from the input/output unit 23.

The battery exchanger 3 includes a sensor 31, a drive unit 32, a charging unit 33, a communication unit 34, an input/output unit 35, a display unit 36, a storage unit 37, and a control unit 38.

The sensor 31 may consist of a human sensor, for instance, to detect a person who has visited the battery exchanger 3 for battery exchange.

User authentication may be performed to identify the user who has visited the battery exchanger 3 for battery exchange. In this case, the user may be identified by face recognition from the image captured by a camera. In addition, the user may be identified by communication with an RFID (radio frequency identifier) tag or a non-contact type IC card possessed by the user, or the user terminal 5 equipped with the NFC (Near Field Communication) function. Further, the user being about to return the battery pack 2 may be detected by reading a two-dimensional code affixed to the battery pack 2 from the image captured by a camera.

In response to an instruction from the control unit 38, the drive unit 32 drives the opening/closing mechanism of a door at the timing of returning and lending out the battery packs 2. The returned battery packs 2 are stored, and a dispensing mechanism is activated to release the battery packs 2 to be lent out to the users. Upon detecting a user by using the sensor 31, the control unit 38 initiates a battery exchange operation, and opens the door to receive a battery pack 2 from the user.

The charging unit 33 charges the battery pack 2 held in the corresponding slot (tray).

The communication unit 34 communicates with the management server 4 via the network.

The input/output unit 35 forwards and receives information to and from each battery pack 2, and receives the serial number of the battery pack 2, alerts, deterioration information, and the like from the battery pack 2.

The display unit 36 displays a guidance screen for guiding the user in exchanging the battery packs 2.

The storage unit 37 stores a program to be executed by the processor that forms the control unit 38. The storage unit 37 also stores an in-use battery list regarding the battery packs 2 that are available for the battery exchange service, and a lending priority list that earmarks the battery packs 2 to be lent out by the battery exchanger 3, and determines the priority of the battery packs 2 to be lent out. The in-use battery list and the lending priority list are received from the management server 4.

The control unit 38 is formed by a processor, and controls various parts of the battery exchanger 3. For example, based on the in-service battery list, the control unit 38 determines if the returned battery pack 2 is a genuine product (or if the battery pack 2 is an object that is covered by the battery exchange service). Further, the control unit 38 commands the drive unit 32 to select the battery pack 2 to be lent out according to the lending priority list, and to dispense the selected battery pack 2 to the user. Further, a returned/lent list (including the serial numbers and the like) regarding the returned battery packs 2 and the lent out battery packs 2 is transmitted from the communication unit 34 to the management server 4.

The management server 4 includes a communication unit 41, a storage unit 42, and a control unit 43.

The communication unit 41 communicates with the battery exchangers 3, the user terminals 5, the management terminal 6, and the maintenance terminal 7 via the network.

The storage unit 42 stores the program executed by the processor forming the control unit 43. In addition, the storage unit 42 stores various pieces of management information such as user registration information, an in-service battery list regarding the battery packs 2 that are available for the battery exchange service, an excluded battery list regarding the battery packs 2 that are excluded from the battery exchange service, and linking information that indicates the relationship between the battery packs 2 and the users to whom the battery packs 2 are lent.

The control unit 43 includes a user management unit 51, a station management unit 52, a battery management unit 53, a station information presentation unit 54, a system management unit 55, a notification management unit 56, and a reservation management unit 57. The control unit 43 is formed by a processor, and the various components of the control unit 43 are realized by executing the program stored in the storage unit 42 by the processor.

The user management unit 51 manages the users who use the battery packs 2. For example, the administrator receives an application for new registration from a user, and registers the user information (such as a user ID, a name, an address, and the vehicle type of the electric vehicle used) (user registration).

The station management unit 52 manages the battery station and the battery exchanger 3 placed in the battery station. For example, when a battery pack 2 is exchanged for another by the battery exchanger 3, the lending priority list that defines the battery packs to be lent out, and the lending order are updated, and transmits the updated lending priority list to the battery exchanger 3 via the communication unit 41.

The battery management unit 53 manages the battery packs 2 that are being lent. For example, when starting the service, the serial numbers of the battery packs 2 are registered in the in-use battery list (new registration). Further, battery management unit 53 manages the linking information that associates each battery pack 2 that is lent out with the user. Each time the battery packs 2 are exchanged in the battery exchanger 3, the linking information is updated by using the returned/lent list received from the relevant battery exchanger 3. When the administrator performs an operation to terminate the use of a battery pack 2 of a certain registration number on the management terminal 6, the serial number entered from the management terminal 6 is registered in the excluded battery list.

The station information presentation unit 54 presents the information on the battery station to the user. For example, a station guidance screen for guiding the user to the battery station is generated and forwarded to the user terminal 5 to be displayed on the user terminal 5. On this station guidance screen, the position of the battery station and the number of available battery packs 2 at the battery station are shown.

At this time, based on management information about the battery configuration of the electric vehicle 1 used or operated by each user, the station information presentation unit 54 searches a battery station that suits the battery configuration for the electric vehicle of the user, and displays the searched battery station on the guidance screen. The battery configuration as used in this disclosure includes the number of battery packs that are used or carried by the electric vehicle 1, and a battery station that has an equal or larger number of fully charged battery packs to or than the number of battery packs used by the electric vehicle 1 is extracted and displayed on the guidance screen.

The management information includes user registration information containing the vehicle model of the electric vehicle 1 operated by the user, and the battery configuration can be obtained from the vehicle model of the electric vehicle 1. In particular, the battery configuration of the electric vehicle 1 of the user can be obtained from the user ID of the user obtained at the time of login.

In addition, the management server 4 may be configured to extract battery stations that are located within a target area of a prescribed size around the current position of the user according to the position information of the user acquired by the user terminal 5 by using GPS or other means and transmitted to the management server 4. It may be arranged such that the user is able to freely select the size of the target area. Alternatively, the management server may select the size of the target area by computing the distance which the electric vehicle 1 can travel on the remaining charge of the battery packs 2 which is acquired from the electric vehicle 1 by the user terminal 5 and transmitted to the management server 4.

Furthermore, in this embodiment, it is assumed that there is only one type of battery packs 2 to be used by the battery exchange service, and the battery configuration of each electric vehicle 1 consists of the number battery packs 2 carried by the electric vehicle 1, but it is also possible to use a plurality of kinds of battery packs 1 in the battery exchange service. In such a case, the battery configuration includes the kinds of the battery packs, in addition to the numbers of the battery packs 1.

The system management unit 55 monitors the status of the system, and presents the status of the system to the administrator or a maintenance person. For example, a management screen is generated and forwarded to the management terminal 6 or the maintenance terminal 7 to display the status of the system on the management terminal 6 or the maintenance terminal 7 so that the administrator or the maintenance person is enabled to view the status of the system. More specifically, information on the state of the battery exchanger placed in each battery station, the state of the battery packs 2 received in each battery exchanger 3, the state of the battery exchange operation performed by each battery exchanger 3, and the like is collected (information collection), and the collected state information is displayed on the management screen. Further, the items detected from the system state information are displayed on the management screen as an error (abnormality), an alert (warning), and a normal notification according to the degree of urgency.

The notification management unit 56 manages notifications (notices) to the users. More specifically, guidance on opening and closing of battery stations, maintenance information such as construction work to be performed at the battery stations, and guidance on the suspension of battery exchange reservations due to network failures or the likes are transmitted to the user terminals 5.

The reservation management unit 57 manages the battery exchange reservations by the users. More specifically, a battery exchange reservation is accepted when the user performs a prescribed reservation operation on the user terminal 5. In addition, a battery exchange reservation is canceled when the user performs a prescribed cancel operation on the user terminal 5. Also, if the battery exchange is not performed within a predetermined time period after accepting a battery exchange reservation, the battery exchange reservation is forcibly canceled.

Figure 3:
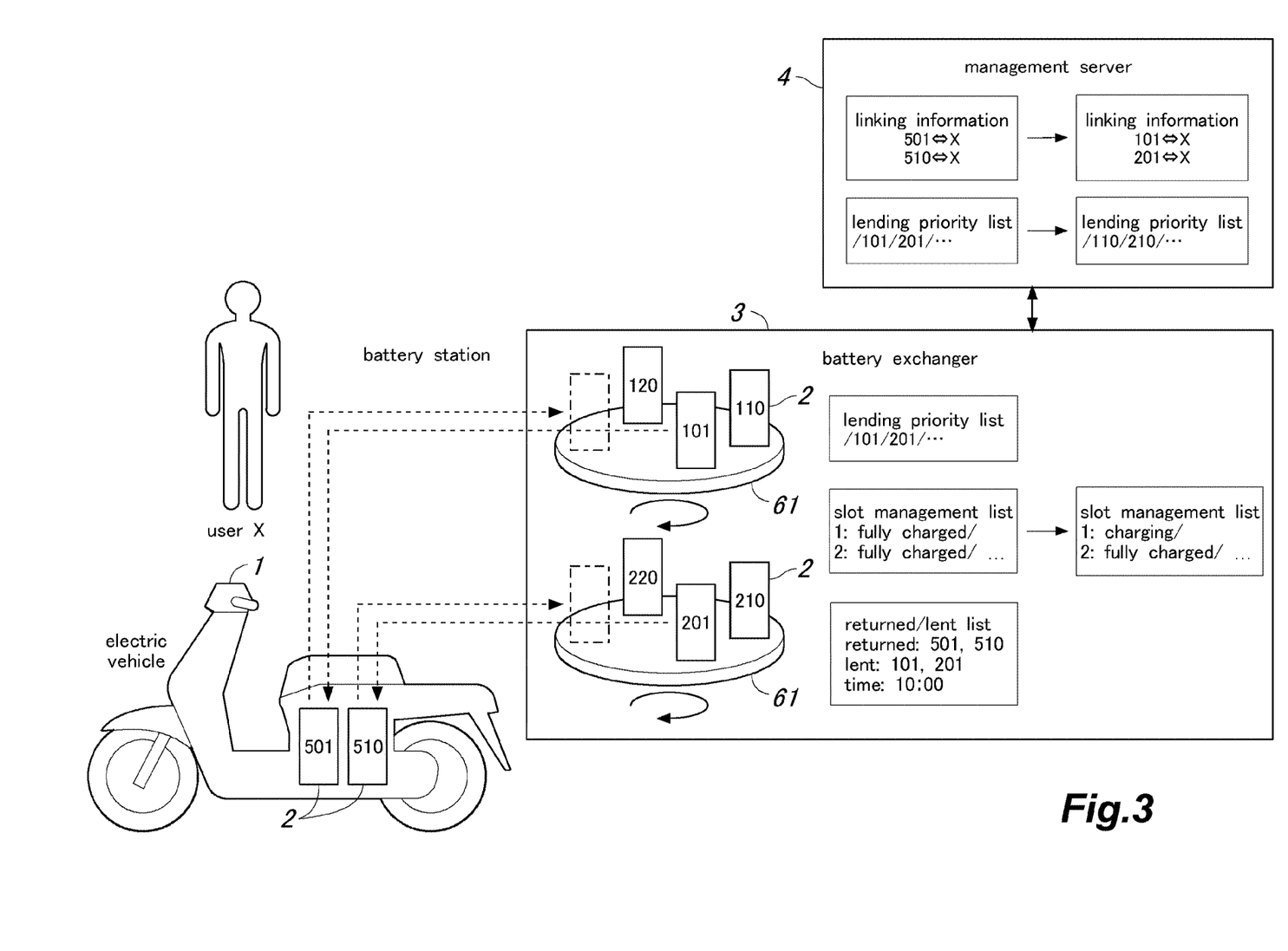
FIG. 3 is a schematic diagram illustrating a general mode of operation of the system in exchanging batteries.

The mode of operation of the system in exchanging battery packs 2 is described in the following. FIG. 3 is a schematic diagram illustrating a general mode of operation of the system in exchanging batteries. Each battery pack 2 is given a three-digit serial number in FIG. 3 for the convenience of description, but may be given, for instance, an eight-digit serial number in practice.

One or a plurality of battery packs 2 are mounted on the electric vehicle 1. In the case where a plurality of battery packs 2 are mounted, all of the battery packs 2 are simultaneously replaced.

In this embodiment, the battery exchanger 3 is configured to receive a plurality of battery packs 2. The battery exchanger 3 is provided with a plurality of turntables 61 (storing/dispensing mechanisms) each fitted with a plurality of slots (trays) each configured to hold one battery pack 2. In the example shown in FIG. 3, a pair of turntables 61 each having four slots are provided in two stages one above the other so that a total of eight battery packs 2 can be received.

In this battery exchanger 3, each turntable 61 has a vacant slot so that one returned battery pack 2 can be stored in each turntable 61. When two battery packs 2 are exchanged for new ones at the same time, each of the two turntables 61 receives a returned battery pack 2, and each of the two turntables 61 dispenses one battery pack 2. Thus, for example, when the number of the battery packs 2 mounted on the electric vehicle 1 is two, the two battery packs 2 can be simultaneously exchanged by constructing the battery exchanger 3 in two stages. In addition, one battery station may have a plurality (four, for instance) of battery exchangers. Thus, when four battery packs 2 are mounted on each electric vehicle 1, the four battery packs 2 mounted on the electric vehicles 1 can be replaced at the same time.

In the example shown in FIG. 3, the number of battery packs 2 mounted on the electric vehicle 1 is two, but the number may also be one or may also be three or more. Further, the turntable 61 is used as the battery exchanger 3 in this embodiment, but a locker type exchanger having a plurality of rechargeable battery receptacles arranged vertically and horizontally may also be used. Furthermore, it is also possible to arrange a plurality of receptacles either horizontally or vertically to store the battery packs, and receive and dispense the battery packs into and out of the receptacles by using a lift mechanism or the like.

When the battery packs 2 are exchanged at the battery exchanger 3, a returned/lent list (exchange information) is created, and transmitted to the management server 4. In this returned/lent list, the serial number of the returned battery pack 2, the serial number of the lent battery pack 2, and the time point of battery exchange (time stamp) are recorded.

The management server 4 manages the linking information that associates the lent battery packs 2 with the users who have lent the battery packs 2. Upon receiving the returned/lent list from the battery exchanger 3, the management server 4 updates the linking information (linking process) according to the returned/lent list. Owing to the employment of such a linking process, simply by registering the user information in association with the lent battery pack 2, the user information is maintained by the management server 4 by referring to the returned/lent list of the battery packs 2 so that the need for a complex operation such as authenticating the user every time the battery packs 2 are exchanged is eliminated, and the inconvenience to the user is significantly minimized.

Further, the battery exchanger 3 periodically updates a slot management list, and transmits the updated slot management list to the management server 4. In this slot management list, the charge state and the vacancy state of the battery pack 2 in each slot are indicated. As a result, the management server 4 can manage the charge state and the vacancy state of each battery pack 2 in the battery exchanger 3.

Further, the management server 4 generates a lending priority list (lending instruction information) indicating the battery packs 2 that have been fully charged in the battery exchanger 3 and are therefore available for lending out from the battery exchanger 3, and transmits the list to the battery exchanger 3.

Based on the lending priority list received from the management server 4, the battery exchanger 3 selects the battery packs 2 to be lent out, and dispense them. The lending priority list describes the order in which the battery packs 2 are preferentially lent out, and the battery packs 2 having the highest priority are lent out.

In addition, the management server 4 updates the lending priority list every time the battery packs 2 are exchanged according to the returned/lent list received from the battery exchanger 3, and transmits the updated returned/lent list to the battery exchanger 3.

In this conjunction, according to the present embodiment, the battery packs 2 are lent out according to the lending priority list, and the lending priority may be set in the order in which charging is completed. However, the lending order may also be set according to a prescribed policy on the utilization of the battery packs 2. For instance, the deterioration state of each battery pack 2 may be transmitted to the management server 4, and the lending order may be set in a descending order of deterioration levels. Thus, by preferentially lending out the battery packs 2 having higher deterioration levels, such battery packs 2 can be recovered in short periods of time to be replaced with new ones.

Figure 4:
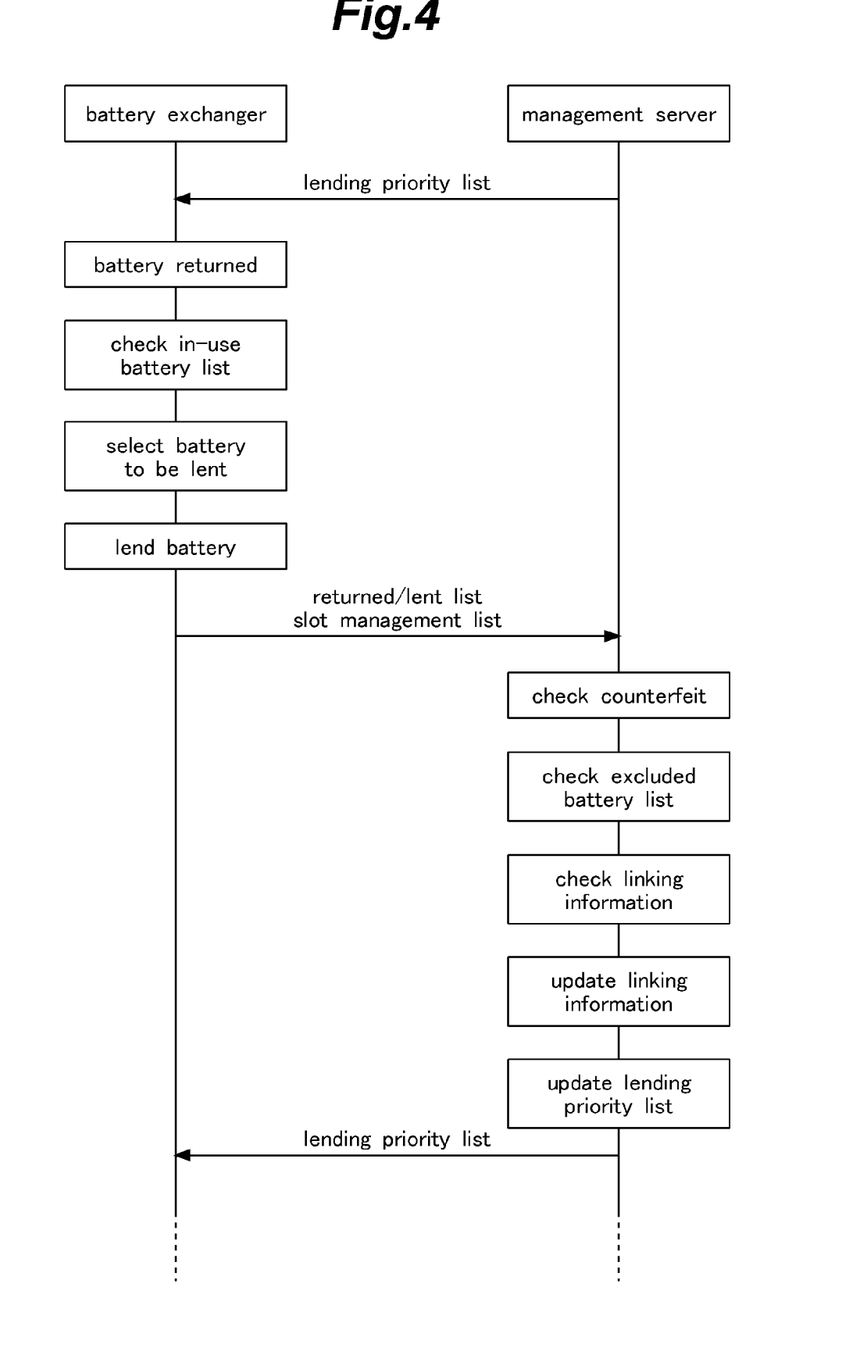
FIG. 4 is a sequence diagram showing an operating procedure of the system in exchanging batteries.

The operating procedure of the system in exchanging the battery packs is described in the following. FIG. 4 is a sequence diagram showing the operating procedure of the system in exchanging battery packs.

First of all, the management server 4 transmits to the battery exchanger 3 a lending priority list that defines the lending order of the battery packs 2.

In the battery exchanger 3, when the user returns a battery pack 2, it is determined if the returned battery pack 2 is a genuine product (the battery pack 2 that is covered by the battery exchange service) according to the in-use battery list. The in-use battery list is transmitted from the management server 4 to the battery exchanger 3 in advance.

Next, in the battery exchanger 3, the battery pack 2 to be lent is selected based on the lending priority list received from the management server 4, and the selected battery pack 2 is lent to the user.

Then, the battery exchanger 3 transmits the returned/lent list to the management server 4. This returned/lent list includes information (the serial number, etc.) on the returned battery pack 2 and the lent battery pack 2.

Upon receiving the returned battery pack 2, the management server 4 determines the possibility of the returned battery pack 2 being a counterfeit product by examining if the serial number of the returned battery pack 2 is unknown or is duplicated by referring to the in-use battery list. If the returned battery is suspected to be a counterfeit, an alert is issued.

The management server 4 then compares the serial number of the returned battery pack 2 with the excluded battery list, and determines if the returned battery pack 2 is not eligible for the battery exchange service. If the serial number matches with an entry in the excluded battery list, the battery pack 2 is excluded from the registration in the lending priority list. In such a case, an alert may be issued so that the excluded battery may be removed from the battery exchange service.

Thereafter, the management server 4 examines the linking information between the battery pack 2 and the ID of the user who has been lending the battery pack 2. More specifically, it is determined if there is the linking information for the battery pack 2 that is returned in the online state. Further, when a plurality of battery packs 2 are returned, it is also determined if the linking information of each and every battery pack 2 is linked to the same user ID.

The management server 4 then updates the linking information as a linking process. This linking process updates the linking information by assigning the user ID linked to the returned battery pack 2 in the online state to the newly lent battery pack 2.

Next, the management server 4 updates the lending priority list. At this time, among the battery packs 2 stored in the battery exchanger 3, those battery packs 2 that are fully charged are assigned with a lending priority order based on a prescribed rule. The updated lending priority list is transmitted to the battery exchanger 3.

Figure 5:
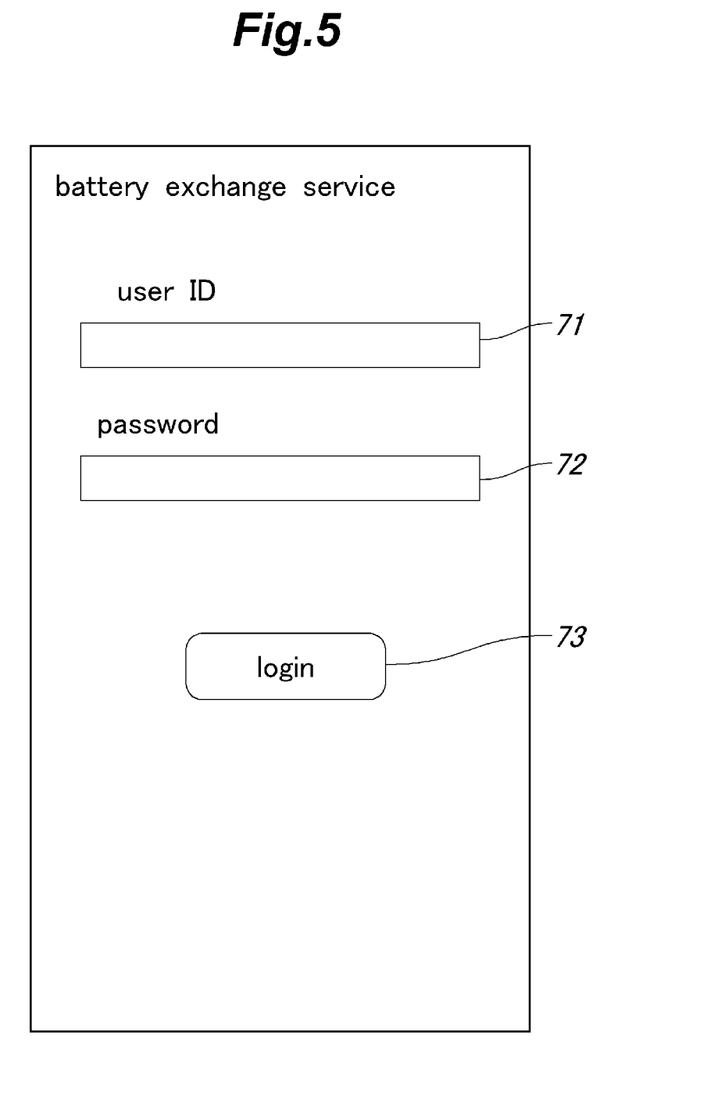
FIG. 5 is an explanatory view of a login screen displayed on the user terminal 5.

Next, a login screen displayed on the management terminal 6 is described in the following. FIG. 5 is an explanatory view of the login screen that may be displayed on the management terminal 6.

In this embodiment, the login screen is displayed on the user terminal 6 when the user terminal 5 accesses the management server 4. This login screen and subsequently displayed screens are generated by a station search application installed on the user terminal 5.

Figure 6:
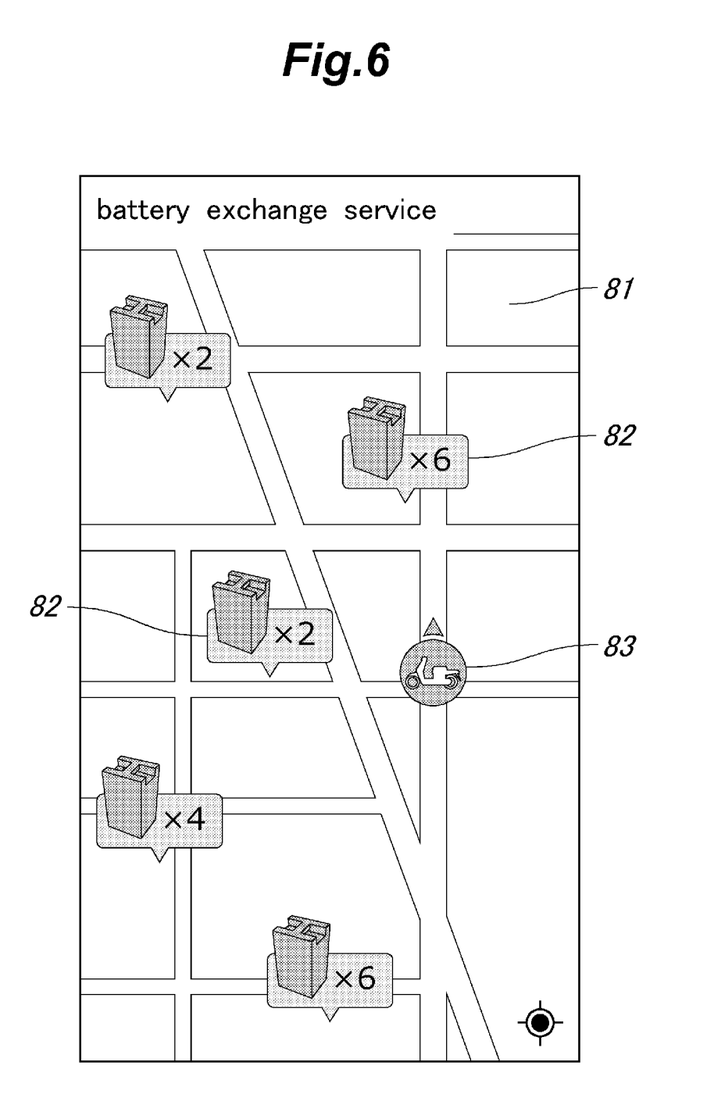
FIG. 6 is an explanatory view of a station guidance screen displayed on the user terminal 5.

This login screen includes a user ID input section 71, a password input section 72, and a login button 73. When the user operates the login button 73 after entering a user ID and a password, the management server 4 performs user authentication according to the entered user ID and password. When the user authentication is successfully performed, the display on the user terminal 5 changes to a station guidance screen (which is shown in FIG. 6).

The display on the user terminal 5 changes from the login screen to the station guidance screen in this embodiment, but alternatively, it may be arranged such that the display changes from the login screen to a menu screen, and upon performing a selecting operation for the station guidance screen on this menu screen, the display changes to the station guidance screen.

Next, the station guidance screen displayed on the user terminal 5 is described in the following. FIG. 6 is an explanatory diagram showing the station guidance screen.

This station guidance screen is displayed when the user terminal 5 accesses the management server 4 and logs in.

The station guidance screen includes icons 82 of the battery station superimposed on an area map 81 (map image). These battery station icons 82 show the number of battery packs 2 that can be exchanged, or in other words, the number of fully charged battery packs 2 that can be lent out at each battery station.

In addition, an electric vehicle icon 83 representing the current location of the electric vehicle 1 is superimposed on the area map 81 on the station guidance screen. The management server 4 acquires position information from the user terminal 5, and displays the electric vehicle icon 83 according to the acquired position information.

When any one of the battery station icons 82 is operated (for example, tapped), detailed information on the corresponding battery station (location, contact information, etc.) is displayed.

This station guidance screen shows only those battery stations where the user can exchange the necessary number of battery packs 2. In other words, the battery station icon 82 is displayed for each of the battery stations that have the necessary number of fully charged battery packs for the electric vehicle operated by the user, and not for the battery stations that do not have the necessary number of fully charged battery packs 2. For instance, the user of an electric vehicle 1 which uses a pair of battery packs 2 is guided to a battery station having at least two fully charged battery packs 2, and not to a battery station having only one fully charged battery pack 2.

The icons 82 for the battery stations where the user cannot exchange the necessary number of battery packs are not displayed in this embodiment, but alternatively, such battery stations may be grayed out or otherwise made less conspicuous.

Figure 7:
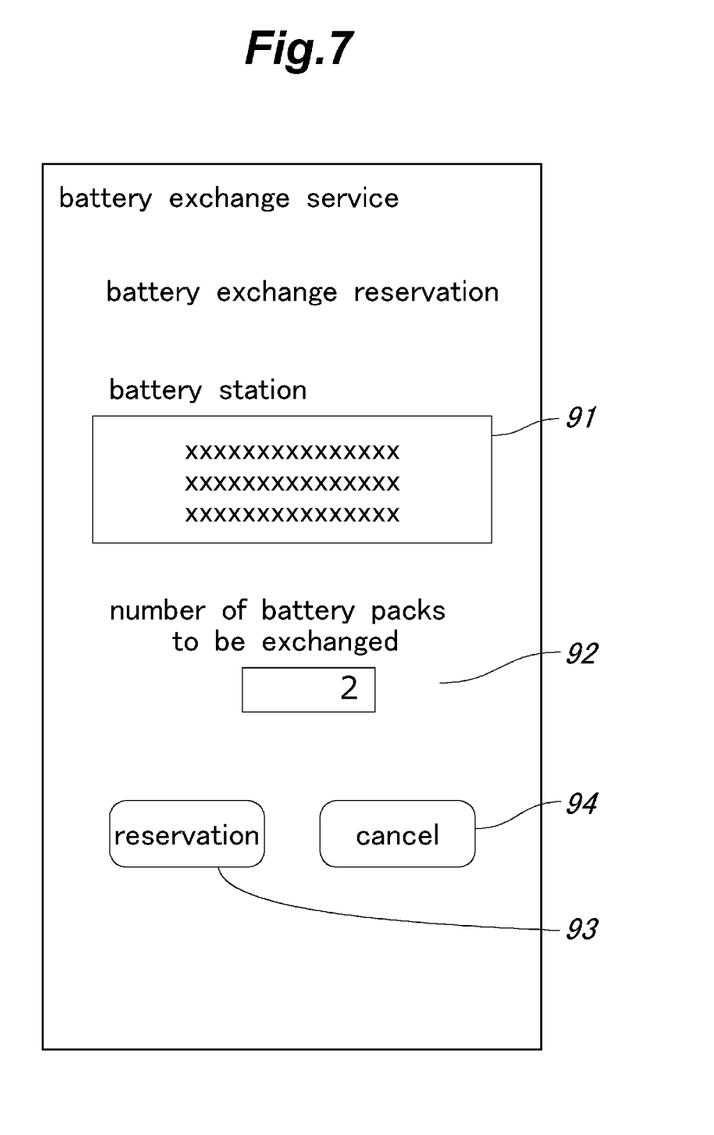
FIG. 7 is an explanatory view of a battery exchange reservation screen displayed on the user terminal 5.

It may be arranged such that when the icon 82 for a battery station is operated (pressed for a certain time period, for instance), the station guidance screen changes to a battery exchange reservation screen (see FIG. 7).

The battery exchange reservation screen that may be displayed on the user terminal 5 is described in the following. FIG. 7 is an explanatory view of the battery exchange reservation screen.

This battery exchange reservation screen can be produced by operating the icon 82 for a battery station in the station guidance screen (see FIG. 6).

The battery exchange reservation screen includes a battery station display section 91 and an exchange number display section 92. The battery station display section 91 shows information (such as the name and location) on the battery station at which the battery exchange is to be performed. The exchange number display section 92 shows the number of battery packs 2 to be exchanged.

When the user has checked the battery station and the number of battery packs 2 to be exchanged, and operated a reservation button 93, the management server 4 executes a process of accepting a reservation for a battery exchange. When a cancel button 94 is operated, the screen returns to the station guidance screen (see FIG. 6).

The present invention has been described in terms of a specific embodiment, but is not limited by such an embodiment, and can be modified, substituted, added and omitted in other embodiments. Also, a new embodiment may be created by combining various components of the foregoing embodiment.

INDUSTRIAL APPLICABILITY

The battery management system, the battery management method and the terminal according to the present invention provide various advantages by allowing the user to readily determine a battery station where a battery exchange can be performed without fail, and are therefore highly beneficial when used in a battery exchange service whereby users of electric vehicles or the like exchange battery devices at battery stations as a battery management system, a battery management method and a terminal device carried by the user for managing the battery devices that are being used.

| GLOSSARY OF TERMS | |
|---|---|
| 1 electric vehicle | 2 battery pack (battery device) |
| 3 battery exchanger (battery exchange device) | |
| 4 management server (server device) | 5 user terminal (terminal device) |
| 6 management terminal | 7 maintenance terminal |
| 31 sensor | 32 drive unit |
| 33 charging unit | 34 communication unit |
| 35 input/output unit | 36 display unit |
| 37 storage unit | 38 control unit |
| 41 communication unit | 42 storage unit |
| 43 control unit | |
| 61 turntable (storing/dispensing mechanism) | |

The invention claimed is:

1. A battery management system, comprising:

a plurality of battery exchange devices provided in a plurality of battery stations to receive and recharge battery devices used by battery using devices operated by users and returned by the users, and lend out recharged battery devices in exchange for returned battery devices; and a server device connected to the plurality of battery exchange devices via a network to manage a status of exchanging battery devices at each battery exchange device; and terminal devices carried by the users and connected to the server device via the network, wherein the server device is configured to store management information including a necessary number of battery devices used by each battery using device and transmit a guidance screen, for guiding a user to a battery station, to a terminal device carried by the user when a number of fully charged battery devices in a battery exchange device in the battery station is equal to or greater than the necessary number of the battery devices used by the battery using device of the user included in the management information, the guidance screen showing only battery stations where the user can exchange the necessary number of battery devices, and
the necessary number of the battery devices used by the battery using device of the user is stored in advance of a login of the user of the battery using device and obtained at a time of the login.

2. The battery management system according to claim 1, wherein each of the plurality of battery exchange devices is provided with a storing/dispensing mechanism that stores returned battery devices and dispenses fully charged battery devices by revolving a retainer for battery devices.

3. The battery management system according to claim 1, wherein the guidance screen includes battery station icons of the battery stations, where the user can exchange the number of battery devices, superimposed on an area map, the battery station icons showing a total number of battery devices that can be exchanged.

4. The battery management system according to claim 3, wherein the server device is configured to transmit a battery exchange reservation screen to the terminal device, the battery exchange reservation screen being produced by operating one of the battery station icons for a battery station, where the user can exchange the number of battery devices, in the guidance screen.

5. The battery management system according to claim 4, wherein the battery exchange reservation screen shows a requested number of battery devices to be exchanged in the battery using device of the user.

6. A battery management method for managing battery devices that are being offered for a battery exchange service in a server device, the server device being connected to the plurality of battery exchange devices via a network to manage a status of exchanging battery devices at each battery exchange device, the battery exchange devices receiving and recharging battery devices used by battery using devices operated by users and returned by the users, and lending out recharged battery devices in exchange for returned battery devices, the battery management method comprising:

storing management information including a necessary number of battery devices used by each battery using device;

obtaining, at a time of a login of a user, the necessary number of the battery devices used by a battery using device of the user; and     transmitting a guidance screen, for guiding the user to a battery station, to a terminal device carried by the user when a number of fully charged battery devices in a battery exchange device in the battery station is equal to or greater than the necessary number of the battery devices used by the battery using device of the user included in the management information, the guidance screen showing only battery stations where the user can exchange the necessary number of battery devices,     wherein the necessary number of the battery devices used by the battery using device of the user is stored in advance of the login of the user of the battery using device.

7. A terminal device carried by each user and connected to a server device via a network, wherein     the server device is connected to a plurality of battery exchange devices via a network to manage a status of exchanging battery devices at each of the plurality of battery exchange devices, the plurality of battery exchange devices provided in a plurality of battery stations to receive and recharge battery devices used by battery using devices operated by users and returned by the users, and lend out recharged battery devices in exchange for returned battery devices, and     the server device is configured to store management information including a necessary number of battery devices used by each battery using device and transmit a guidance screen, for guiding a user to a battery station, to a terminal device carried by the user when a number of fully charged battery devices in the battery exchange device in the battery station is equal to or greater than the necessary number of the battery devices used by the battery using device of the user included in the management information, the guidance screen showing only battery stations where the user can exchange the necessary number of battery devices, and     the necessary number of the battery devices used by the battery using device of the user is stored in advance of a login of the user of the battery using device and obtained at a time of the login.

\* \* \* \* \*